US008712008B2

(12) United States Patent
Foland

(10) Patent No.: US 8,712,008 B2
(45) Date of Patent: *Apr. 29, 2014

(54) GENERATING A REPRESENTATION OF AN OBJECT OF INTEREST

(71) Applicant: L-3 Communications Security and Detection Systems, Inc., Woburn, MA (US)

(72) Inventor: Andrew Dean Foland, Wellesley, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,541

(22) Filed: May 8, 2013

(65) Prior Publication Data
US 2014/0079283 A1  Mar. 20, 2014

Related U.S. Application Data

(63) Continuation of application No. 13/022,122, filed on Feb. 7, 2011, now Pat. No. 8,457,273, which is a continuation of application No. 12/416,684, filed on Apr. 1, 2009, now Pat. No. 7,885,380.

(60) Provisional application No. 61/042,192, filed on Apr. 3, 2008.

(51) Int. Cl.
*G01N 23/04*  (2006.01)

(52) U.S. Cl.
USPC .......................................... 378/57; 378/96.12

(58) Field of Classification Search
USPC .............. 378/57, 98.11, 98.12; 382/100, 103, 382/141, 154
See application file for complete search history.

(56) References Cited

U.S. PATENT DOCUMENTS

| 7,587,082 | B1  |   | 9/2009  | Rudin et al. |
|-----------|-----|---|---------|--------------|
| 7,885,380 | B2  |   | 2/2011  | Foland |
| 8,457,273 | B2  | * | 6/2013  | Foland .......................... 378/57 |
| 2006/0023835 | A1 | * | 2/2006  | Seppi .............................. 378/57 |
| 2006/0187221 | A1 |   | 8/2006  | Lakare et al. |
| 2007/0172129 | A1 |   | 7/2007  | Tortora et al. |
| 2007/0297560 | A1 |   | 12/2007 | Song et al. |
| 2008/0013819 | A1 |   | 1/2008  | Eilbert et al. |

OTHER PUBLICATIONS

International Search Report and Written Opinion for International Application No. PCT/US09/39192, mailed May 15, 2009.

(Continued)

*Primary Examiner* — Glen Kao
(74) *Attorney, Agent, or Firm* — Fish & Richardson P.C.

(57) ABSTRACT

A volumetric image of a space is acquired from an imaging system. The space includes an object of interest and another object, and the volumetric image includes data representing the object of interest and the other object. A two-dimensional radiograph of the space is acquired from the imaging system. The two-dimensional radiograph of the space includes data representing the object of interest and the other object. The two-dimensional radiograph and the volumetric image are compared at the imaging system. A two-dimensional image is generated based on the comparison. The generated two-dimensional image includes the object of interest and excludes the other object.

18 Claims, 5 Drawing Sheets

(56) References Cited

OTHER PUBLICATIONS

M. Goitein, "Three-Dimensional Density Reconstruction from a Series of Two-Dimensional Projections," Nuclear Instruments and Methods 101, 1972, pp. 506-518, North-Holland Publishing Co.
Notice of Allowance for U.S. Appl. No. 12/416,684, dated Oct. 7, 2010.
Non-Final Office Action for U.S. Appl. No. 12/416,684, dated Jun. 21, 2010.
Office Action for U.S. Appl. No. 13/022,122, mailed Sep. 26, 2011.
Office Action for U.S. Appl. No. 13/022,122, mailed Apr. 26, 2012.
Office Action for U.S. Appl. No. 13/022,122, mailed Nov. 27, 2012.
Notice of Allowance for U.S. Appl. No. 13/022,122, mailed.

* cited by examiner

GENERATING A REPRESENTATION OF AN OBJECT OF INTEREST

CROSS-REFERENCE TO RELATED APPLICATIONS

This application is a continuation U.S. patent application Ser. No. 13/022,122, filed Feb. 7, 2011, now allowed, which is a continuation of U.S. Application Ser. No. 12/416,684, filed Apr. 1, 2009, now U.S. Pat. No. 7,885,380, which claims the benefit to U.S. Provisional Application Ser. No. 61/042, 192, titled GENERATING IMAGES OF OBJECTS, and filed on Apr. 3, 2008. All of these prior applications are incorporated herein by reference in their entirety.

TECHNICAL FIELD

This disclosure relates to techniques for generating a representation of an object of interest.

BACKGROUND

A screening system that is designed to screen objects (e.g., packages, luggage, hand-carried items, and/or larger objects such as shipping containers and trucks) for the presence of explosives, hazardous materials, contraband, or other types of objects of interest may produce a relatively low-resolution volumetric (e.g., three-dimensional) image of a region. However, direct visualization and/or analysis of the volumetric image may pose challenges in determining whether the volumetric image includes a representation of an object of interest.

SUMMARY

In one general aspect, a high-resolution, two-dimensional image that includes an object of interest but not clutter objects is created from a volumetric image and a two-dimensional radiograph. The volumetric image and the two-dimensional radiograph include representations of clutter objects and the object of interest. The two-dimensional radiograph and the volumetric image are both produced by a screening system that images the clutter objects and the object of interest.

In another general aspect, a materials screening system includes a scan region configured to receive an object, a source of radiation configured to illuminate the scan region, and a sensor configured to sense radiation from the scan region. The system also includes a processor, and a computer-readable storage medium storing instructions for generating a two-dimensional image of the object of interest. When executed, the instructions cause the processor to generate a volumetric image of the scan region based on the sensed radiation, the volumetric image including a representation of an object of interest and another object, to generate a two-dimensional radiograph of the scan region based on the sensed radiation, the two-dimensional radiograph including a representation of the object of interest and the other object, and to analyze the volumetric image to identify the object of interest or the other object. Based on the analyzed volumetric image, a two-dimensional image that excludes the object of interest is generated. The two-dimensional radiograph and the two-dimensional image that excludes the identified object of interest are compared and a two-dimensional image based on the comparison is generated. The generated two-dimensional image includes the object of interest and excludes the other object.

Implementations may include one or more of the following features. The source may be configured to produce x-ray radiation, and the sensor may be configured to sense x-ray radiation. The volumetric image may be analyzed to identify the object of interest, and the identified object of interest may be removed from the volumetric image to generate a de-objectified volumetric image. Generating a two-dimensional image that excludes the object of interest may include forward-projecting the de-objectified volumetric image. The instructions to cause the processor to compare the two-dimensional radiograph and the two-dimensional image that excludes the identified object of interest may include instructions to cause the processor to subtract the two-dimensional radiograph from the two-dimensional image. The system also may include a display module.

In another general aspect, an apparatus for generating images of an object of interest includes a source of radiation configured to emit radiation that illuminates a space and interacts with an object of interest in the space and another object in the space. The apparatus also includes a sensor configured to sense radiation from the space, a processor, and a computer-readable storage medium storing instructions for generating a two-dimensional image of the object of interest, the instructions, when executed, causing the processor to acquire sensed data from the sensor to generate a two-dimensional radiograph of the space. The two-dimensional radiograph includes a representation of the object of interest and a representation the other object. Sensed data is acquired from the sensor to generate a volumetric image of the space, the volumetric image being of lower spatial resolution than the two-dimensional radiograph, and the volumetric image including a representation of the object of interest and a representation of the other object. A two-dimensional image is generated from the two-dimensional radiograph and the volumetric image. The two-dimensional image includes the object of interest and excludes the other object.

Implementations may include one or more of the following features. The source of radiation may be a source of x-ray radiation, and the sensor configured to sense radiation may include a detector configured to sense x-ray radiation passing through the object of interest and the other object. The space may be a cavity in a screening apparatus that is configured to image an object in the cavity. The space may be an open region that is illuminated by the source of radiation.

In another general aspect, a volumetric image of a space is acquired from an imaging system. The space includes an object of interest and another object, and the volumetric image includes data representing the object of interest and the other object. A two-dimensional radiograph of the space is acquired from the imaging system. The two-dimensional radiograph of the space includes data representing the object of interest and the other object. The two-dimensional radiograph and the volumetric image are compared at the imaging system. A two-dimensional image is generated based on the comparison. The generated two-dimensional image includes the object of interest and excludes the other object.

Implementations may include one or more of the following features. The generated two-dimensional image may be presented. The object of interest may be identified in the volumetric image, and a de-objectified image may be generated by removing the object of interest from the volumetric image. Comparing the two-dimensional radiograph and the volumetric image may be achieved by comparing the de-objectified image to the two-dimensional radiograph. The de-objectified image may be a two-dimensional image that excludes the object of interest, and comparing the two-dimensional radiograph and the volumetric image may include subtracting the de-objectified image from the two-dimensional radiograph. The de-objectified two-dimensional image and the acquired two-dimensional radiograph may be registered with each other prior to subtracting the de-objectified two-dimensional image from the acquired two-dimensional radiograph. The de-objectified two-dimensional image may be filtered. The identified object of interest may be represented in the volumetric image by one or more voxels, and removing the identified object of interest from the volumetric image may include setting the one or more voxels equal to zero.

In some implementations, the acquired two-dimensional radiograph may have a higher spatial resolution than the acquired volumetric image. At least a portion of the object of interest may obscure at least a portion of the other object in the acquired two-dimensional radiograph.

Two-dimensional radiographs may be repeatedly acquired and each of the two-dimensional radiographs may be compared to the volumetric image.

Implementations of any of the techniques described above may include a method, a process, a system, a device, an apparatus, or instructions stored on a computer-readable storage medium. The details of one or more implementations are set forth in the accompanying drawings and the description below. Other features will be apparent from the description and drawings, and from the claims.

DETAILED DESCRIPTION

Figure 1A:
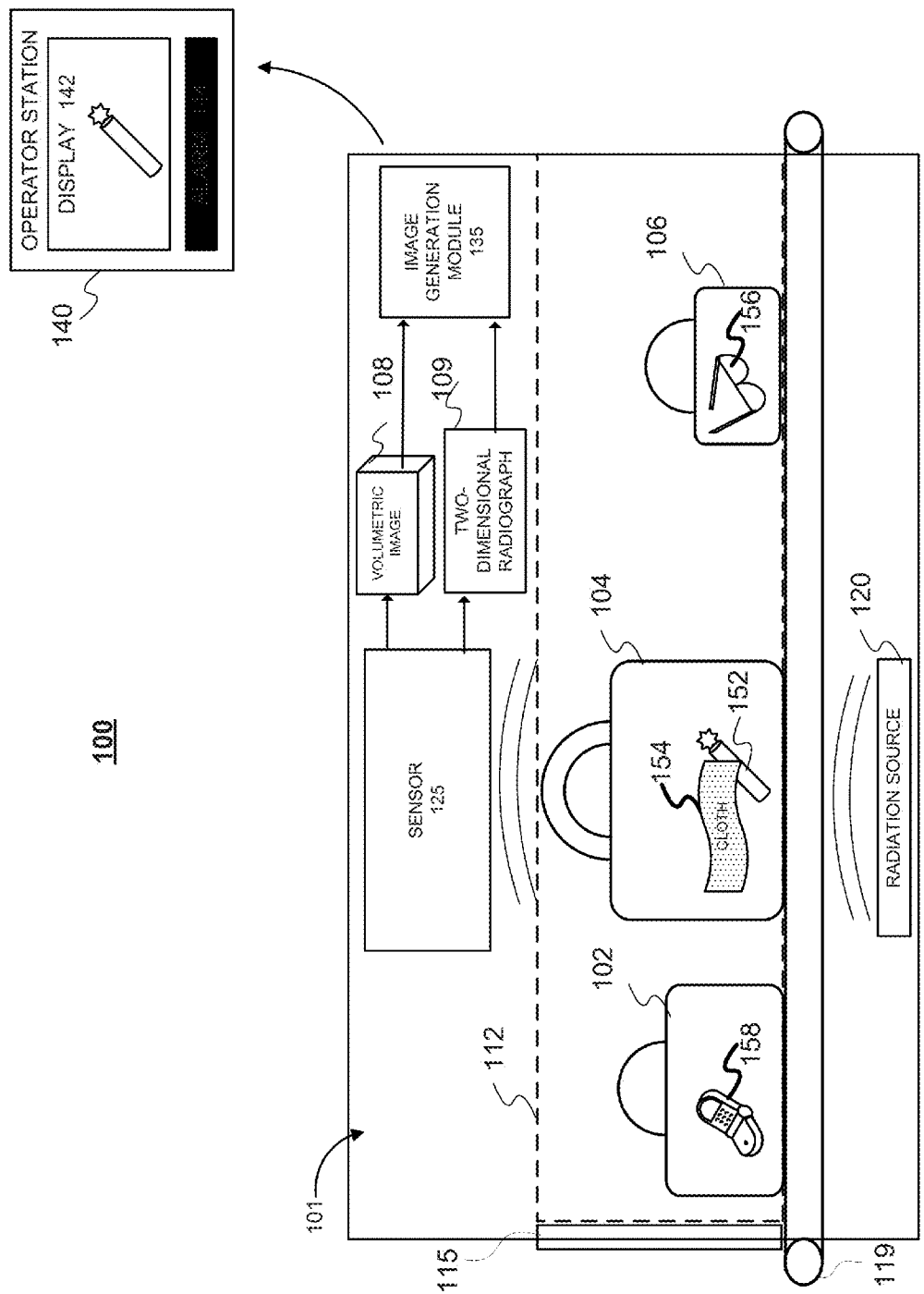
FIG. 1A illustrates an example of a screening system.

Referring to FIG. 1A, an example system 100 for detecting the presence of objects of interest such as explosives, hazardous materials, controlled substances (e.g., illegal drugs and narcotics), or contraband in containers 102, 104, and 106 is illustrated. The system 100 may be referred to as a materials screening system, and the system 100 includes a screening device 101 that produces a two-dimensional image of an object of interest without clutter objects. The system 100 may be used to process, image, and/or analyze a large volume of containers at, for example, a civilian, military, or commercial airport, a rail station, a bus terminal, a seaport, a public gathering place, or a border checkpoint.

As discussed in more detail below, the screening device 101 produces a two-dimensional image of an object of interest without clutter from a volumetric (e.g., three-dimensional) image 108 and a two-dimensional radiograph 109. The volumetric image 108 and the two-dimensional radiograph 109 each include representations of objects that are in a scan region 112 of the screening device 101. The scan region 112 may include objects of interest and objects that are not of interest (e.g., clutter objects). Thus, the volumetric image 108 and the two-dimensional radiograph 108 may include representations of the object of interest and clutter objects. However, using the techniques discussed below, the volumetric image 108 and the two-dimensional radiograph 109 may be used to produce a two-dimensional image that only includes the object of interest. This two-dimensional image of the object of interest may be presented to an operator of the system 100 and/or provided to an automated process for further analysis.

As compared to techniques that rely on direct viewing and/or automated processing of the volumetric image 108 (either with or without the clutter objects present), viewing or processing a two-dimensional image that includes only the object of interest, may result in improved performance due to easier viewing of the object of interest. For example, the generated two-dimensional image does not include overlapping objects, whereas the volumetric image 108 and the two-dimensional radiograph 109 usually do include overlapping objects. Thus, the generated two-dimensional image may be easier to view and understand as compared to the two-dimensional radiograph 109 or the volumetric image 108. Additionally, in some implementations, the generated two-dimensional image is a relatively high spatial resolution image as compared to the volumetric image 108, and the generated two-dimensional image may provide a better representation of the region imaged. In these implementations, the generated two-dimensional image is created from the two-dimensional radiograph 109, which has a higher spatial resolution than the volumetric image 108. For example, the volumetric image 108 may include voxels that represent a cubic space that is 3.5 to 5 millimeters on a side. The two-dimensional radiograph 109 may be an image that includes pixels that represent a square space that is 0.5 to 1.0 millimeters on a side, for example.

Figure 3:
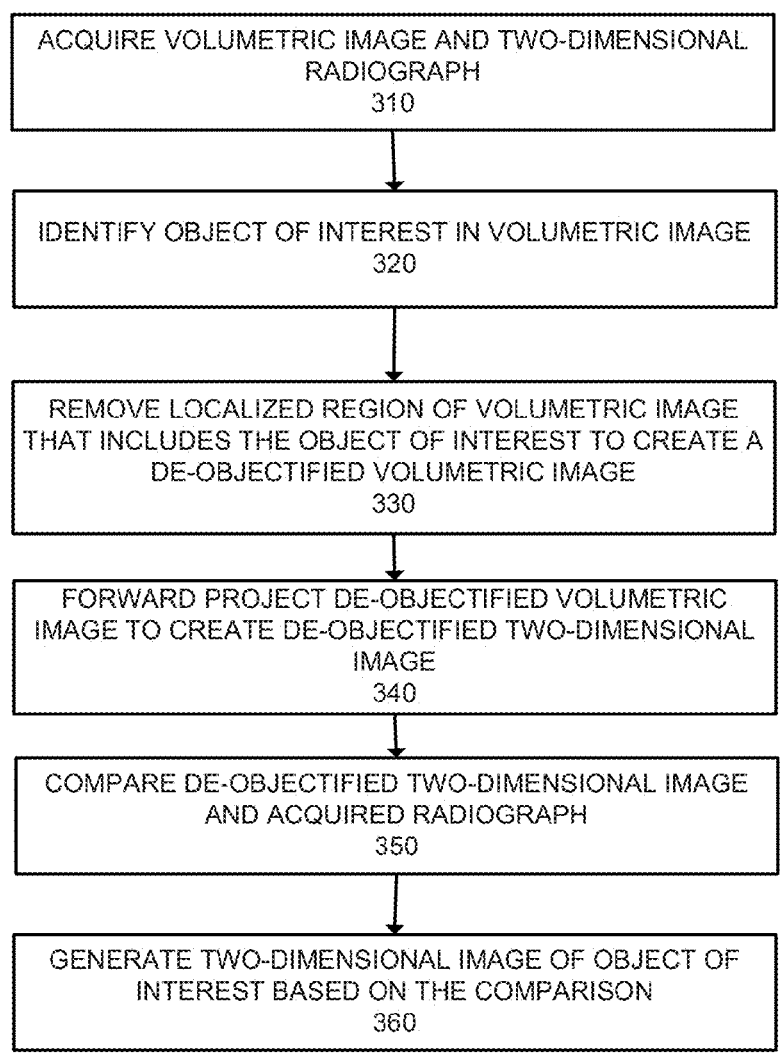
FIG. 3 illustrates a process for generating a two-dimensional representation of an object of interest.
Figure 4:
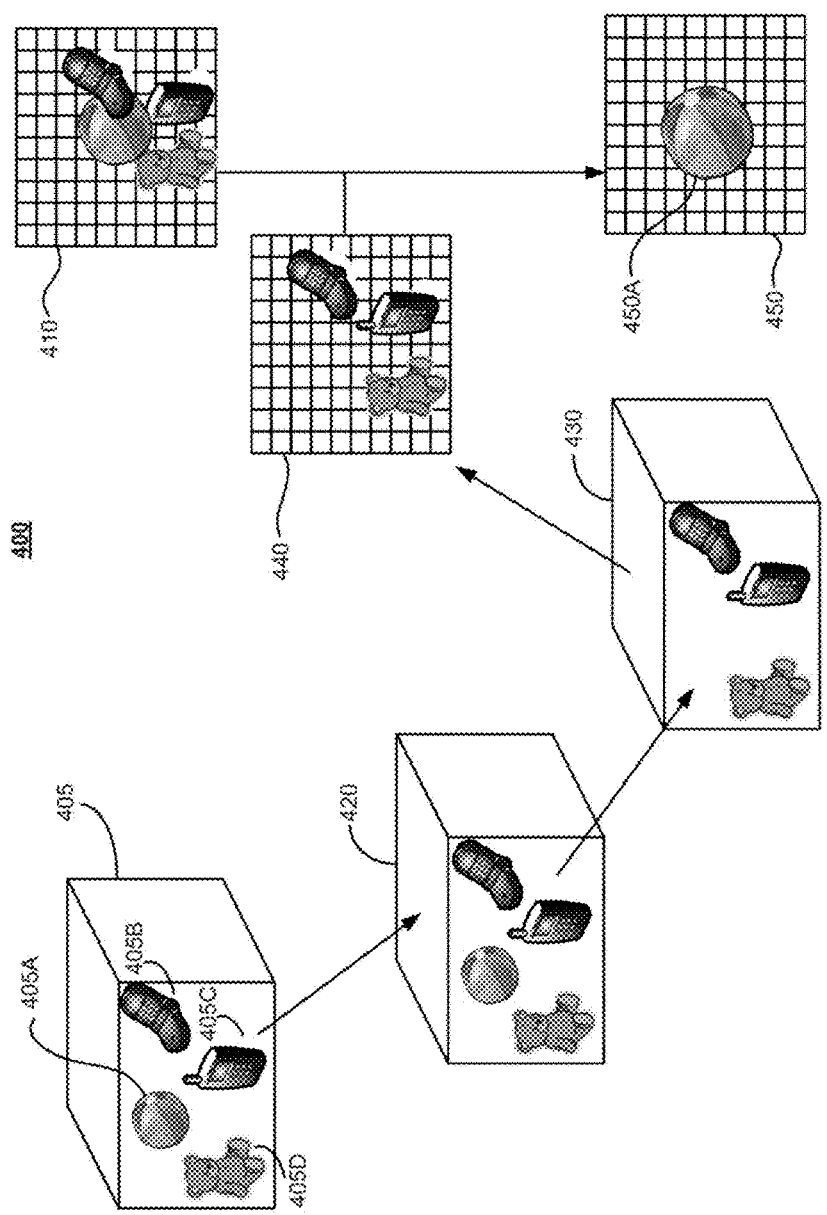
FIG. 4 shows an illustration of volumetric images and two-dimensional images used to generate a two-dimensional representation of an object of interest.

As discussed in greater detail with respect to FIGS. 3 and 4, to generate the two-dimensional image of the object of interest, the object of interest may be identified in the volumetric image 108 and removed from the volumetric image 108. Identifying the object of interest also allows the clutter objects to be identified because the clutter in the volumetric image 108 may be the other portions of the volumetric image 108 besides those that include the identified object of interest. Objects other than the object of interest (e.g., clutter objects) are identified in the volumetric image 108 and removed from the two-dimensional radiograph 109 to produce a high-resolution two-dimensional image that includes the object of interest but not the clutter objects. The clutter objects may be removed from the two-dimensional radiograph 109 by, for example, subtracting the clutter objects from the two-dimensional radiograph 109.

In greater detail, in the example shown in FIG. 1A, the system 100 includes a screening device 101 that images the containers 102, 104, and 106 while the containers 102, 104, and 106 are present in the scan region 112. The containers 102, 104, and 106 may be present in the scan region 112 as the containers pass through the scan region 112 on a conveyor belt 119, or the containers 102, 104, and 106 may be stationary in the scan region 112. In the example shown in FIG. 1A, the containers 102, 104, and 106 enter the scan region 112 at an entrance 115. The entrance 115 may be covered by a removable door or other type of cover (not shown).

Thus, the scan region 112 may be considered to be a volumetric region or space that is configured to receive objects that are imaged by the screening device 101. The scan region 112 may be imaged by, for example, illuminating the scan region 112 with radiation from a radiation source 120. In some implementations, the source 120 is an x-ray source that illuminates the scan region, and any objects in the scan region, with x-ray radiation. In these implementations, the scan region 112 may be imaged by sensing the x-ray radiation that passes through the scan region and any objects present in the scan region, at a sensor 125, and generating both the volumetric image 108 and the two-dimensional radiograph 109 from the sensed radiation.

The volumetric image 108 may be, for example, a three-dimensional computed tomography image that is produced from a full volumetric reconstruction of the data collected by the sensor 125. The two-dimensional radiograph 109 may be an x-ray projection of a portion of the scan region 112 or the entire scan region 112. As discussed above, the two-dimensional radiograph 109 may have a higher spatial resolution than the volumetric image 108. The volumetric image 108 is a representation of the scan region 112 and objects within the scan region 112, and the two-dimensional radiograph 109 is a two-dimensional image of the scan region 112.

Figure 1B:
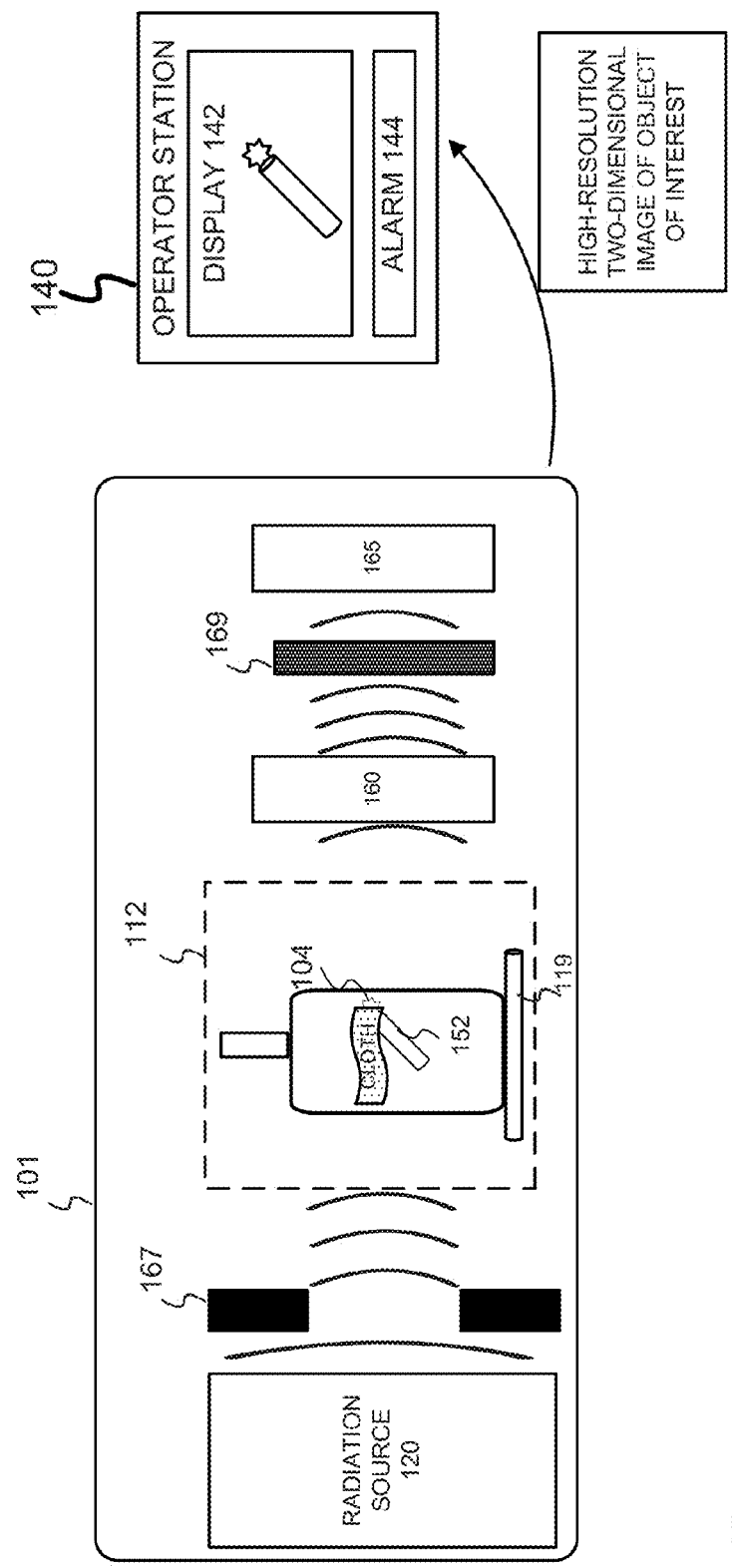
FIG. 1B illustrates a side-view of the example screening system of FIG. 1A.

Referring to FIG. 1B, a side view of the screening device 101 is shown. The screening device 101 includes the radiation source 120, which may be an x-ray source, a first detector 160 and a second detector 165. The screening device 101 also may include a collimator 167 and a filter 169. The radiation source 120, the first detector 160, the second detector 165, the collimator 167, and the filter 169 are outside of the scan region 112, and the suitcase 104 is within the scan region 112.

In some implementations, the radiation source 120 exposes an object of interest that is inside the scan region 112, such as the suitcase 104, to x-ray radiation of at least two energy levels. The x-rays may be collimated by the collimator 167, which may be made of lead or another material of sufficient thickness to block the x-rays. The collimated x-rays pass through the suitcase 104, are attenuated by the suitcase 104 and the contents of the suitcase 104, and the attenuated x-rays are sensed by the first detector 160. The first detector 160 may be, for example, a scintillator, and the some or all of the attenuated x-rays may pass through the first detector 160. The filter 169 may be placed in front of the second detector 165 such that only x-rays having energies below a cut-off energy of the filter 169 reach the second detector 165. The filter 169 may be made from a metal material such as, for example, copper. The arrangement of the first and second detectors shown in the example of FIG. 1B may be referred to as a front-to-back configuration. In a front-to-back configuration, the detectors 160 and 165 image the same area of the scan region 112, thus data collected by the detectors 160 and 165 generally is aligned at the time of detection without further correction. In some implementations, the first detector 160 and the second detector 165 may be placed next to each other in a side-by-side configuration. In some implementations, the screening device 101 may include just one detector.

Thus, the first and second detectors 160 and 165 sense attenuated x-rays that pass through the suitcase 106. The sensed x-rays are used to generate the volumetric image 108 and the two-dimensional image 109 of the scan region 112 and the contents of the scan region 112.

Returning to FIG. 1A, an image generation module 135 processes the volumetric image 108 and the two-dimensional image 109 (both of which include the object of interest and clutter to produce a two-dimensional image that only includes the object of interest. The two-dimensional image of the object of interest may be presented at an operator station 140 at a display 142. In the example shown in FIG. 1A, an alarm 144 may be triggered based on the presence of the explosive 152.

Although in the example shown in FIG. 1A, the system 100 detects the presence of objects of interest in containers that are used in relation to commerce and/or transportation, in other examples, the techniques discussed below may be used to detect the presence of objects of interest in other contexts. For example, the techniques discussed below may be used in medical imaging applications to determine whether, for example, biological tissues of a human patient or a tissue sample are diseased or healthy, or to image hard structures such as bones in the patient.

Figure 2:
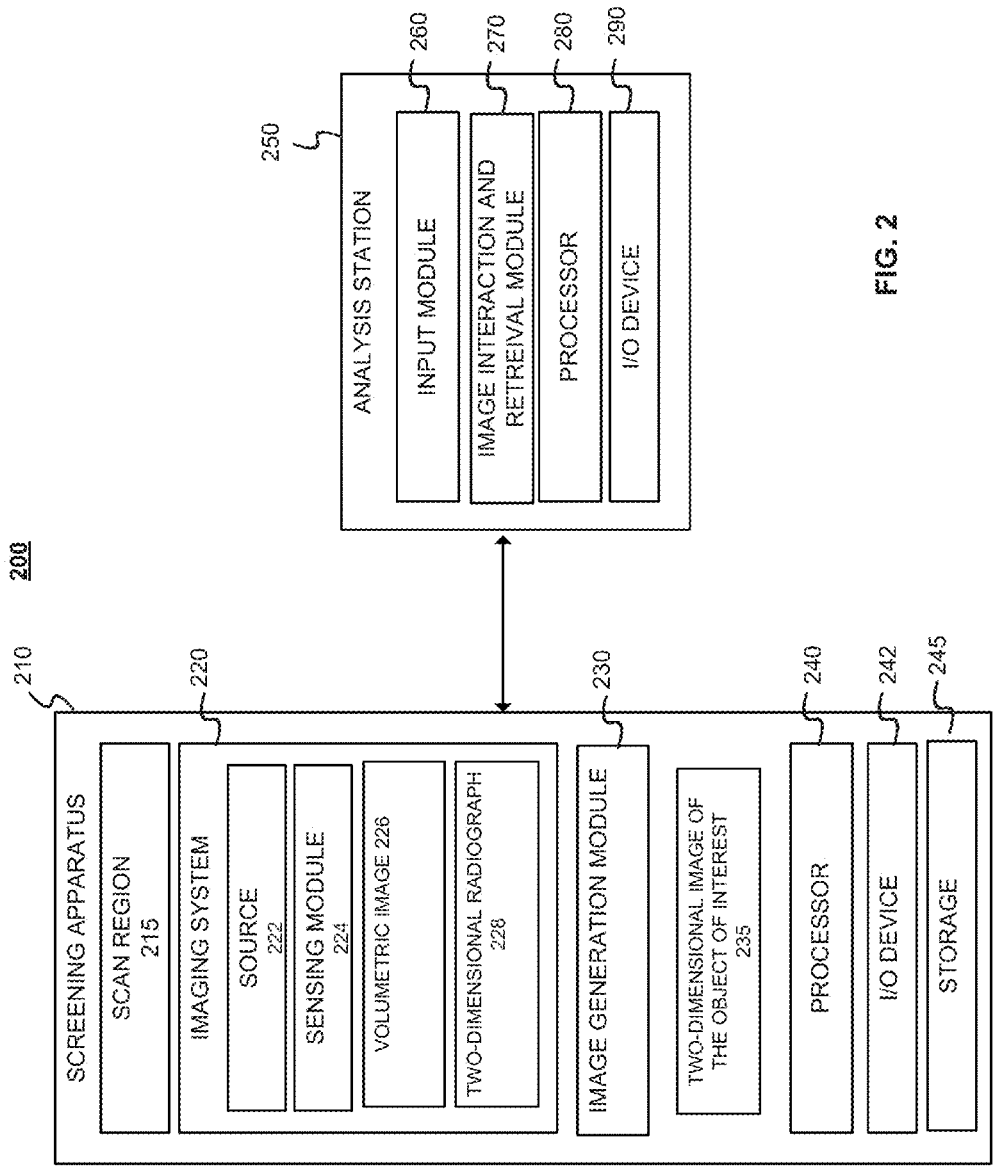
FIG. 2 illustrates a block diagram of a screening system.

Referring to FIG. 2, a block diagram of an example screening system 200 is shown. The system 200 includes a screening apparatus 210 and an analysis station 250 that displays two-dimensional image data of an object of interest received from the screening apparatus 210. The system 200 may be similar to the system 100 discussed with respect to FIGS. 1A and 1B.

The screening apparatus 210 may be used to screen objects to determine whether the object includes items of interest. The screening apparatus 210 includes a scan region 215 that is configured to receive an object (such as a container or a human patient) to be imaged with the screening apparatus 210. The screening apparatus 210 also includes an imaging system 220, an image generation module 230, a processor 240, an input/output device 242, and an electronic storage 245. The screening apparatus 210 generates a two-dimensional image that includes only a representation of an object of interest from a volumetric image and a two-dimensional radiograph, each of which include representations of the object of interest and clutter objects.

The scan region 215 is appropriately sized depending on the types of objects to be screened. For example, the scan region 215 may be large enough to receive a suitcase or other hand-transportable luggage item. The scan region 215 may accommodate a truck or shipping container. In other examples, the scan region 215 may be sized to accommodate a human patient. The scan region 215 may pass through the screening apparatus 215, or the scan region 215 may be open at just one end of the screening apparatus 215.

The screening apparatus 210 also includes the imaging system 220, which includes a source 222 and a sensing module 224. The imaging system 220 images the inside of the scan region 215 and the objects within the scan region 215 to produce a volumetric image 226 of the scan region 215 and the objects inside of the scan region 215. The imaging system 220 also produces a two-dimensional image 228 of the scan region 215. The source 222 may be a source that emits x-rays, and the source 222 may be similar to the radiation source 120 discussed above with respect to FIG. 1B. The sensing module 224 includes detectors that sense radiation produced by the source 222.

The image generation module 230 generates a two dimensional image of an object of interest from the volumetric image of the scan region 215 and a two-dimensional radiograph of the scan region 215. The screening apparatus 210 also includes the processor 240, the input/output device 242, and the storage 245. The storage 245 stores instructions that, when executed by the processor 240, cause the image generation module 230 to perform operations such as identifying an object of interest in the volumetric image 108. The storage 245 also may store data sensed by the sensing module 224, instructions for retrieving the data from the sensing module 224, and instructions for generating a volumetric image based on the data from the sensing module 224. The storage 245 is an electronic memory module, and the storage 245 may be a non-volatile or persistent memory. The storage 245 may be volatile memory, such as RAM. In some implementations, the storage 245 may include both non-volatile and volatile portions or components.

The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instruction and data from the components of the screening apparatus 210, such as, for example, the imaging system 220 and/or the image generation module 230, to, for example, analyze data from the imaging system 220 to generate a two-dimensional image that includes only a representation of the object of interest but not clutter objects. In some implementations, the screening apparatus 210 includes more than one processor.

The input/output device 242 may be any device able to transmit data to, and receive data from, the screening apparatus 210. For example, the input/output device 242 may be a mouse, a touch screen, a stylus, a keyboard, or any other device that enables a user to interact with the screening apparatus 210. In some implementations, the input/output device 242 may be configured to receive an input from an automated process or a machine or to provide an output to an automated process or a machine.

The system 200 also includes the analysis station 250. The analysis station 250 includes an input module 260, an interface generation module 270, an image interaction and retrieval module 270, a processor 280, and an input/output device 290. The analysis station 250 may be similar to the operator station 140 discussed above with respect to FIG. 1A. The input module 260 receives the two-dimensional image of the object of interest from the screening apparatus 210 or the image generation module 230. The two-dimensional image may be transferred over a wireless or wired network connection. The interface generation module 270 displays the two-dimensional image that includes a representation of the object of interest but not the clutter objects on a display such as the display 142 discussed above with respect to FIG. 1A. The analysis station also includes an image interaction and retrieval module 265 that allows interaction with the displayed image. For example, the image interaction and retrieval module 265 may allow an operator to zoom in on an area of interest in the two-dimensional image.

The analysis station 250 also includes a processor 270 and an input/output device 280. The processor 270 executes instructions that cause the interface generation module 260 to generate and display the interface and process commands received from the input/output device 280. The input/output device 280 may be any device that allows a user to interact with the analysis station 250. For example, the input/output device 280 may be a mouse, a keyboard, or a touch screen. Although in the example of FIG. 2, the analysis station 250 and the screening apparatus 210 are shown as separate components that are in communication with each other, this is not necessarily the case. In some implementations, the analysis station 250 is integrated into the screening apparatus 210.

In one implementation, the screening apparatus 210 is a continuous image reconstruction system in which the source 222 continuously produces radiation and exposes the scan region 215 to the radiation, and the sensing module 224 continuously senses radiation from the source 222. The imaging system 220 produces volumetric image of the scan region 215 based on the radiation sensed by the sensing module 224. Thus, implementations in which the screening apparatus 210 is a continuous image reconstruction system, the volumetric image 226 and the two-dimensional radiograph 228 of the scan region 215 are generated regardless of whether the scan region 215 includes an object.

In a second implementation, the screening apparatus 210 is a non-continuous image reconstruction system. In this implementation, the screening apparatus 210 also includes photocells (not shown) that detect the presence of a container in the scan region 215, and the presence of a container triggers the source 222 to produce radiation, the sensing module 224 senses radiation passing through the container, and the imaging system 220 generates the volumetric image 226 and the two-dimensional radiograph 228 from the radiation sensed by the sensing module 224. Thus, in implementations in which the screening apparatus 210 is a non-continuous image reconstruction system, the volumetric image 228 and the two-dimensional radiograph are only created when an object is present in the scan region 215.

Referring to FIGS. 3 and 4, an example process 300 that uses three-dimensional data and two-dimensional data to generate a high-resolution, two-dimensional image of an object of interest is illustrated. The process 300 may be performed by one or more processors included in a screening system such as the system 100 or the system 200 discussed above with respect to FIGS. 1A, 1B, and 2. The two-dimensional image generated by the process 300 includes a representation of an object of interest but does not include a representation of clutter objects.

A volumetric image 405 and a two-dimensional image 410 are acquired from the screening system (310). The volumetric image 405 and the two-dimensional radiograph 410 may be generated from sensed radiation as discussed above with respect to FIGS. 1A, 1B, and 2. Referring also to FIG. 4, the volumetric image 405 is a three-dimensional representation of a bag that is in the scan region 215 of the screening system, and the two-dimensional image 410 is a two-dimensional representation of the objects within the bag. The volumetric image 405 may be voxelized to the volumetric image 420, in which the geometric objects 405A-405D represented in the volumetric image 405 are converted into voxel representations (e.g., the objects 405A-405D are voxelized). A voxel is a cubic unit of volume that represents a unit of volume, and a voxel may be regarded as the counterpart to a pixel that represents a unit of area in a two-dimensional image. The volumetric image 420 may be referred to as the voxelized reconstruction of the volumetric image 405.

The bag that is imaged in the example shown in FIG. 4 includes four objects, a ball 405A, a phone 405B, a personal digital assistant (PDA) 405C, and a plush toy 405D. In this example, the ball 405A is the object of interest, and the phone 405B, the PDA 405C, and the plush toy 405D are considered clutter objects. In other examples, there may be more than one object of interest and more or fewer clutter objects. As shown in FIG. 4, the volumetric image 405 and the voxelized reconstruction 410 include perspective information regarding the relative placement of the objects 405A-405D in the bag. For example, the PDA 405C is in front of and slightly lower than the ball 405A, and the phone 405B is above and to the left of the PDA 405C.

In the two-dimensional radiograph 410, the objects 405A-405D overlap. In contrast to the volumetric image 405 and the voxelized reconstruction 420, the two-dimensional radiograph 410 does not show depth information. Thus, in the two-dimensional radiograph 410, the phone 405B appears to overlap the ball 405A, and the ball 405A appears to overlap the PDA 405C. However, although the two-dimensional radiograph 410 does not show the relative placement of the objects in the bag, the two-dimensional radiograph 410 may be a higher spatial resolution image than the volumetric image 405. In other words, a pixel of the two-dimensional radiograph 410 may represent a smaller physical area than the voxel of the voxelized reconstruction 420. Thus, when displayed, the two-dimensional radiograph 410 may appear sharper and more detailed to a human operator as compared to a direct display of the voxelized reconstruction 420. Similarly, when processed by an automated process, the two-dimensional radiograph 410 may provide more information, in some respects, than the voxelized reconstruction 420. As discussed below, using the information in the voxelized reconstruction 420, the clutter objects 405B-405D may be removed from the radiograph 410 to produce a two-dimensional image 450 of the entire ball 405A (e.g., the object of interest) without the objects 405B-405D (e.g., the clutter objects). The portions of the ball 405A that are obscured by the phone 405A in the radiograph 410 become visible in the two-dimensional image 450 after the clutter objects 405B-405D are removed from the radiograph 410 because the representation in the radiograph 410 includes a summation of radiation from the ball 405A and the phone 405A. Thus, when the portion that represents the phone 405A is removed, only the ball 405A remains in the image 450.

The object of interest (e.g., the ball 405A), is identified in the voxelized reconstruction 420 (320). The object of interest may be identified using a variety of analysis techniques. For example, objects of interest may be known to be round, and an edge detector followed by a filter to detect objects having round outlines may be applied to the volumetric image 405 to find round objects.

Additionally or alternatively, material characteristics of the objects in the volumetric image 405 may be used to identify possible objects of interest. For example, in some security applications, high-density materials (such as lead and metal) are more likely to be objects of interest than low-density materials (such as cloth). In the example shown in FIG. 4, the volumetric image 405 includes voxels representing the bag and the objects 405A-405D within the bag. The volumetric image 405 may be created by sensing x-ray radiation that passed through the bag to a detector. Thus, although the volumetric image 405 includes data that represents the entire bag, only high-density materials are visible in the volumetric image 405. Because the voxels representing the high-density materials are the voxels that most useful for determining whether the bag includes items of interest, the voxels representing the low-density materials may be disregarded as clutter objects and the voxels representing high-density materials may be associated with an object of interest. Specifically, the volumetric image may be a computed tomography (CT) image that includes voxels that represent an imaged object (such as the ball 405A, the phone 405B, the PDC 405C, and the plush toy 405D). The voxels are each associated with a value that approximately corresponds to the average atomic weight of the imaged object. The voxel values may be represented as CT values. The CT values may be expressed in Hounsfield units, and the voxel values may be a value relative to a value that represents an amount of energy passing through a known volume of water and sensed by an x-ray detector. Items of interest from an explosives-detection (and the detection of other contraband items) perspective tend to have a higher density and a higher atomic number as compared to items not of interest (such as air and clothing). Thus, because items of interest tend to be high-density materials, a range of values known to be associated with high-density materials may be determined. Voxels having values within the range of values, or above a value are voxels that may represent items of interest. In contrast, low-density items, such as a cloth, may be represented by voxels that have values below the range of values known to be values of voxels that represent high-density materials. Additionally, the values of the voxels of low-density items such as cloth and air tend to be much less than the values of voxels that represent high-density items of interest. Although items of interest may be higher-density items, in some examples the items of interest may have a low-density than background voxels. In these implementations, voxels having a range of values below the range of values are voxels that represent items of interest.

Thus, the object of interest may be identified within the voxelized reconstruction 420. Additionally, because the portions or regions of the voxelized reconstruction 420 other than those that include the object of interest may be considered clutter, the clutter objects and regions are also identified.

Referring to FIG. 3, a localized region of the voxelized reconstruction 420 that includes the identified object of interest is removed to create a de-objectified volumetric image 430 (330). The localized region of the voxelized reconstruction 420 may include the identified object of interest and voxels in the neighborhood of the identified object of interest. The neighborhood of the identified object of interest may be, for example, voxels within a boundary between the identified object of interest or voxels just outside of the boundary of the identified object of interest. In some implementations, the neighborhood may include all voxels that fall within a region defined by the maximum and minimum spatial coordinates of the identified object of interest. In this example, the region may be approximated by, for example, a circle, ellipse, or rectangle defined by the coordinates. In some implementations, the neighborhood may include voxels that are adjacent to voxels that form a boundary of the identified object of interest and/or voxels that are connected to the identified object of interest.

The de-objectified volumetric image 430 is created by removing the identified object of interest (any the localized volume that includes the identified object of interest) from the voxelized reconstruction 420. The identified object of interest may be removed by, for example, setting the voxels that make up the localized region that includes the object of interest to zero. Thus, the identified object of interest (the ball 405A in this example) is not represented in the de-objectified volumetric image 430, but the clutter objects (the phone 405B, the PDA 405C, and the plush toy 405D) are represented in the de-objectified volumetric image.

The de-objectified volumetric image 430 is forward projected to create a two-dimensional de-objectified image 440 (340). Forward projection refers to the projection of the data in the voxelized reconstruction 420 onto a two-dimensional projection space. The forward projection of the voxelized reconstruction 420 may be considered to be the two-dimensional image that is perceived when viewing the voxelized reconstruction 420 on a two-dimensional display. Thus, the de-objectified volumetric image is a two-dimensional image that includes representations of the clutter objects 405B-405D, but does not include a representation of the object of interest 405A (e.g., the ball).

The de-objectified two-dimensional image 440 and the acquired two-dimensional radiograph 410 are compared (350) such that the clutter objects are removed from the acquired two-dimensional radiograph 410. Comparing the de-objectified two-dimensional image 440 and the two-dimensional radiograph 410 may include subtracting the de-objectified two-dimensional image 440 from the two-dimensional radiograph 410 (or visa versa). As shown in FIG. 4, the de-objectified two-dimensional image 440 includes the phone 405B, the PDA 405C, and the plush toy 405D (the clutter objects) but not the ball 405A (the object of interest). Thus, subtracting the de-objectified two-dimensional image 440 from the two-dimensional radiograph 410 results in the clutter objects being removed from the two-dimensional radiograph 410. Prior to subtracting or otherwise comparing the de-objectified two-dimensional image 440 and the acquired two-dimensional radiograph 410, the de-objectified two-dimensional image 440 and the two-dimensional radiograph 410 are registered such that the clutter objects and the object of interest align in the two images.

In some implementations, instead of identifying the object of interest, the clutter objects and/or clutter regions may be identified in the voxelized reconstruction. The identified clutter objects or clutter regions may be forward-projected and removed from the two-dimensional radiograph.

In some implementations, the two-dimensional radiograph 410 may be processed before the removal of the clutter objects 405B-405D. For example, a low-pass filter may be applied to everything outside of the boundaries of the object of interest. Thus, the low-pass filter is not applied to the object of interest, but the filter is applied to the clutter objects. Application of the low-pass filter may help to reduce or eliminate the occurrence of high-frequency "ghosts" that may otherwise appear in the two-dimensional radiograph. In some implementations, in addition to, or instead of, processing the two-dimensional radiograph 410 with the low-pass filter, the de-objectified image 440 may be processed with the low-pass filter.

A two-dimensional image 450 of the object of interest is generated based on the comparison (360). As shown in FIG. 4, the two-dimensional image 450 includes a ball 405A (e.g., the object of interest), but not the phone 405B, the PDA 405C, or the plush toy 405D (e.g., the clutter objects). In some implementations, the two-dimensional image 450 is the two-dimensional radiograph 410 with the clutter objects removed. In some implementations, the two-dimensional image 450 is a separate image that is generated from the two-dimensional image 410. Thus, a high-resolution, two-dimensional image that includes a representation of the object of interest without the clutter objects is generated.

In some implementations, low-resolution, two-dimensional radiographs that include only the object of interest may be created instead of high-resolution two-dimensional radiographs. In these implementations, the volumetric neighborhood of the object of interest identified in (320, 330) discussed above is forward projected to create a two-dimensional image of the object of interest. Because the voxels in the volumetric neighborhood are from the relatively low-resolution voxelized image 420, this technique tends to produce an image with pixels that represent a larger area than the pixels of the two-dimensional radiograph 410. Thus, this implementation may produce a lower spatial resolution image of the object of interest as compared to the image 450 discussed above. However, this implementation may result in a faster throughput.

A number of implementations have been described. Nevertheless, it will be understood that various modifications may be made without departing from the scope of the disclosure. For example, multiple volumetric images (such as the volumetric image 108) and/or multiple two-dimensional radiographs (such as the two-dimensional radiograph 109) may be produced by the screening device 101. Each of the multiple volumetric images and the two-dimensional radiographs may represent a different portion of the scan region 112. Accordingly, other implementations are within the scope of the following claims.

What is claimed is:

1. An apparatus for generating an image of an object of interest, the apparatus comprising:
   a processor; and
   a computer-readable storage medium storing instructions that, when executed, cause the processor to perform operations comprising:
   accessing a volumetric image of a space, the space including an object of interest and another object, the volumetric image comprising multiple regions with at least one region representing the object of interest and at least one region representing the other object;
   accessing a two-dimensional radiograph comprising data representing the object of interest and data representing the other object;
   identifying, in the volumetric image, a region representing the object of interest;
   generating a de-objectified volumetric image by disregarding the identified region; and
   removing from the two-dimensional radiograph a two-dimensional representation of the other object that is derived from the de-objectified volumetric image to generate a two-dimensional image of the object of interest.

2. The apparatus of claim 1, further comprising a display module in communication with the processor, the display module being configured to output the two-dimensional image of the object of interest.

3. The apparatus of claim 1, further comprising a sensor coupled to the processor, the sensor being configured to sense radiation passing through the object of interest and the other object, and to output data representing the volumetric image of the space and data representing the two-dimensional radiograph.

4. The apparatus of claim 3, wherein the sensor comprises a single detector.

5. The apparatus of claim 3, wherein the sensor comprises a plurality of detectors.

6. The apparatus of claim 1,
   wherein accessing a volumetric image of a space, the space including an object of interest and another object, the volumetric image comprising multiple regions with at least one region representing the object of interest and at least one region representing the other object comprises accessing a volumetric image of a space, the space including an object of interest and another object, the volumetric image comprising multiple voxels with at least one voxel representing the object of interest and at least one voxel representing the other object;
   wherein identifying, in the volumetric image, a region representing the object of interest comprises identifying, in the volumetric image, one or more voxels representing the object of interest; and
   wherein generating a de-objectified volumetric image by disregarding the identified region comprises generating a de-objectified volumetric image by disregarding the identified one or more voxels.

7. A non-transitory computer-readable medium storing software comprising instructions executable by one or more processors which, upon such execution, cause the one or more processors to perform operations comprising:
   accessing a volumetric image of a space, the space including an object of interest and another object, the volumetric image comprising multiple regions with at least one region representing the object of interest and at least one region representing the other object;
   accessing a two-dimensional radiograph comprising data representing the object of interest and data representing the other object;
   identifying, in the volumetric image, a region representing the object of interest;
   generating a de-objectified volumetric image by disregarding the identified region; and
   removing from the two-dimensional radiograph a two-dimensional representation of the other object that is derived from the de-objectified volumetric image to generate a two-dimensional image of the object of interest.

8. The computer readable medium of claim 7, wherein the operations further comprise outputting to a display module the two-dimensional image of the object of interest.

9. The computer readable medium of claim 7, wherein the operations further comprise:
sensing, by a sensor, radiation passing through the object of interest and the other object, and
outputting data representing the volumetric image of the space and data representing the two-dimensional radiograph.

10. The computer-readable medium of claim 9, wherein the sensor comprises a single detector.

11. The computer-readable medium of claim 9, wherein the sensor comprises a plurality of detectors.

12. The computer-readable medium of claim 7,
wherein accessing a volumetric image of a space, the space including an object of interest and another object, the volumetric image comprising multiple regions with at least one region representing the object of interest and at least one region representing the other object comprises accessing a volumetric image of a space, the space including an object of interest and another object, the volumetric image comprising multiple voxels with at least one voxel representing the object of interest and at least one voxel representing the other object;
wherein identifying, in the volumetric image, a region representing the object of interest comprises identifying, in the volumetric image, one or more voxels representing the object of interest; and
wherein generating a de-objectified volumetric image by disregarding the identified region comprises generating a de-objectified volumetric image by disregarding the identified one or more voxels.

13. A computer-implemented method of generating an image of an object of interest comprising:
accessing, by one or more processors, a volumetric image of a space, the space including an object of interest and another object, the volumetric image comprising multiple regions with at least one region representing the object of interest and at least one region representing the other object;
accessing, by the one or more processors, a two-dimensional radiograph comprising data representing the object of interest and data representing the other object;
identifying, by the one or more processors, in the volumetric image, a region representing the object of interest;
generating, by the one or more processors, a de-objectified volumetric image by disregarding the identified region; and
removing, by the one or more processors, from the two-dimensional radiograph a two-dimensional representation of the other object that is derived from the de-objectified volumetric image to generate a two-dimensional image of the object of interest.

14. The method of claim 13, further comprising outputting to a display module the two-dimensional image of the object of interest.

15. The method of claim 13, further comprising:
sensing, by a sensor, radiation passing through the object of interest and the other object, and
outputting data representing the volumetric image of the space and data representing the two-dimensional radiograph.

16. The method of claim 15, wherein the sensor comprises a single detector.

17. The method of claim 15, wherein the sensor comprises a plurality of detectors.

18. The method of claim 13,
wherein accessing a volumetric image of a space, the space including an object of interest and another object, the volumetric image comprising multiple regions with at least one region representing the object of interest and at least one region representing the other object comprises accessing a volumetric image of a space, the space including an object of interest and another object, the volumetric image comprising multiple voxels with at least one voxel representing the object of interest and at least one voxel representing the other object;
wherein identifying, in the volumetric image, a region representing the object of interest comprises identifying, in the volumetric image, one or more voxels representing the object of interest; and
wherein generating a de-objectified volumetric image by disregarding the identified region comprises generating a de-objectified volumetric image by disregarding the identified one or more voxels.

* * * * *